(12) United States Patent
Yoda et al.

(10) Patent No.: US 11,692,849 B2
(45) Date of Patent: Jul. 4, 2023

(54) MOVABLE STRUCTURE, SENSOR MODULE, AND METHOD FOR CALIBRATING SENSOR MODULE

(71) Applicant: Seiko Epson Corporation, Tokyo (JP)

(72) Inventors: Kentaro Yoda, Chino (JP); Yasunori Hiyoshi, Suwa (JP)

(73) Assignee: SEIKO EPSON CORPORATION

( * ) Notice: Subject to any disclaimer, the term of this patent is extended or adjusted under 35 U.S.C. 154(b) by 307 days.

(21) Appl. No.: 16/887,074

(22) Filed: May 29, 2020

(65) Prior Publication Data

US 2020/0378794 A1 Dec. 3, 2020

(30) Foreign Application Priority Data

May 31, 2019 (JP) .............................. JP2019-102236

(51) Int. Cl.
*G01C 25/00* (2006.01)
*E02F 9/20* (2006.01)
*E02F 9/26* (2006.01)
*E02F 3/43* (2006.01)

(52) U.S. Cl.
CPC ............ *G01C 25/00* (2013.01); *E02F 9/2025* (2013.01); *E02F 9/264* (2013.01); *G01C 25/005* (2013.01); *E02F 3/435* (2013.01)

(58) Field of Classification Search
CPC ......... G01C 25/00; G01C 25/005; E02F 3/43; E02F 3/435; E02F 9/2025; E02F 9/264; E02F 9/265
See application file for complete search history.

(56) References Cited

U.S. PATENT DOCUMENTS

| 2011/0301781 | A1* | 12/2011 | Karlsson .................. E02F 9/26 |
| | | | 701/1 |
| 2016/0281334 | A1* | 9/2016 | Iwamura .............. G01D 5/2449 |
| 2016/0376772 | A1* | 12/2016 | Kondo .................... E02F 9/264 |
| | | | 701/34.4 |
| 2017/0260717 | A1* | 9/2017 | Seki .......................... E02F 3/32 |
| 2018/0171598 | A1* | 6/2018 | Iwamura ................. E02F 9/268 |
| 2018/0282977 | A1* | 10/2018 | Hiromatsu .............. E02F 3/435 |

(Continued)

FOREIGN PATENT DOCUMENTS

| JP | 2005-121437 A | 5/2005 |
| JP | 2018-155027 A | 10/2018 |
| JP | 2018-168584 A | 11/2018 |

*Primary Examiner* — Steven L Yeninas
(74) *Attorney, Agent, or Firm* — Harness, Dickey & Pierce, P.L.C.

(57) ABSTRACT

A movable structure includes: a moving part pivoting about a predetermined axis; a sensor module provided at the moving part or at a site interlocked with the moving part; and a control device controlling the moving part and the sensor module. The control device controls the moving part in such a way that the sensor module takes a first attitude, and gives a calibration instruction to the sensor module. The sensor module includes: an inertial sensor; a calibration unit calculating an attitude of the sensor module based on an output signal from the inertial sensor in response to the calibration instruction and generating correction information based on a difference between the calculated attitude and the first attitude; and a correction unit correcting the output signal from the inertial sensor, based on the correction information.

8 Claims, 5 Drawing Sheets

(56) References Cited

U.S. PATENT DOCUMENTS

| | | | | |
|---|---|---|---|---|
| 2018/0298593 | A1* | 10/2018 | Dusha | E02F 3/431 |
| 2019/0345697 | A1* | 11/2019 | Ishihara | E02F 3/435 |
| 2020/0002914 | A1* | 1/2020 | Yoshida | E02F 9/2271 |
| 2020/0064130 | A1* | 2/2020 | Tinker | G01B 21/22 |
| 2020/0095751 | A1* | 3/2020 | Nishimura | E02F 9/264 |
| 2020/0128717 | A1* | 4/2020 | Rotole | A01B 63/002 |
| 2022/0010519 | A1* | 1/2022 | Izumikawa | E02F 3/437 |
| 2022/0010526 | A1* | 1/2022 | Nishi | E02F 9/261 |
| 2022/0056674 | A1* | 2/2022 | Ishihara | E02F 3/32 |

* cited by examiner

MOVABLE STRUCTURE, SENSOR MODULE, AND METHOD FOR CALIBRATING SENSOR MODULE

The present application is based on, and claims priority from, JP Application Serial Number 2019-102236, filed May 31, 2019, the disclosure of which is hereby incorporated by reference herein in its entirety.

BACKGROUND

1. Technical Field

The present disclosure relates to a movable structure, a sensor module, and a method for calibrating a sensor module.

2. Related Art

JP-A-2018-168584 describes a technique for calibrating a plurality of angle sensors in which, when a working machine is made to operate in such a way that a work point is located at a plurality of reference points on a reference line generated using a laser radiator, the positions of the work points at the plurality of reference points are calculated and calibration values of an angle conversion parameter, a dimension parameter, and a linear parameter are calculated, utilizing that the calculated positions of the work points at the plurality of reference points can satisfy the linear equation of the reference line.

However, the technique for calibrating the sensor described in JP-A-2018-168584 needs the laser radiator in order to generate the reference line. Therefore, for example, in an environment where the laser radiator cannot be used such as when a laser beam is not reflected well due to rain or the like, or at a worksite where there is no staff member who can use a measuring machine such as the laser radiator, the calibration of the sensor is complicated.

SUMMARY

A vehicle according to an aspect of the present disclosure includes: a moving part pivoting about a predetermined axis; a sensor module provided at the moving part or at a site interlocked with the moving part; and a control device controlling the moving part and the sensor module. The control device controls the moving part in such a way that the sensor module takes a first attitude, and gives a calibration instruction to the sensor module. The sensor module includes: an inertial sensor; a calibration unit calculating an attitude of the sensor module based on an output signal from the inertial sensor in response to the calibration instruction and generating correction information based on a difference between the calculated attitude and the first attitude; and a correction unit correcting the output signal from the inertial sensor, based on the correction information.

In the movable structure, the control device may transmit information about the first attitude to the sensor module.

In the movable structure, the first attitude may be a predetermined attitude.

In the movable structure, the control device may control the moving part, based on the output signal from the inertial sensor corrected by the correction unit.

In the movable structure, the moving part may be one of a boom, an arm, and a bucket.

A sensor module according to another aspect of the present disclosure is attached to a moving part of a movable structure or a site interlocked with the moving part, the movable structure having the moving part and a control device controlling the moving part, the moving part pivoting about a predetermined axis. The sensor module includes: an inertial sensor; a calibration unit calculating an attitude of the sensor module based on an output signal from the inertial sensor in response to a calibration instruction from the control device and generating correction information based on a difference between the calculated attitude and a first attitude; and a correction unit correcting the output signal from the inertial sensor, based on the correction information.

A method for calibrating a sensor module according to still another aspect of the present disclosure is a method for calibrating a sensor module. The sensor module includes an inertial sensor and is provided at a moving part or a site interlocked with the moving part. The method includes: causing a control device to control the moving part in such a way that the sensor module takes a first attitude; causing the control device to give a calibration instruction to the sensor module; causing the sensor module to calculate an attitude of the sensor module based on an output signal from the inertial sensor in response to the calibration instruction and to generate correction information based on a difference between the calculated attitude and the first attitude; and causing the sensor module to correct the output signal from the inertial sensor, based on the correction information.

DESCRIPTION OF EXEMPLARY EMBODIMENTS

Preferred embodiments of the present disclosure will now be described in detail with reference to the drawings. However, the embodiments described below should not unduly limit the content of the present disclosure described in the appended claims. Not all the components described below are necessarily essential components of the present disclosure.

1. First Embodiment 1-1. Configuration of Movable Structure

Figure 1:
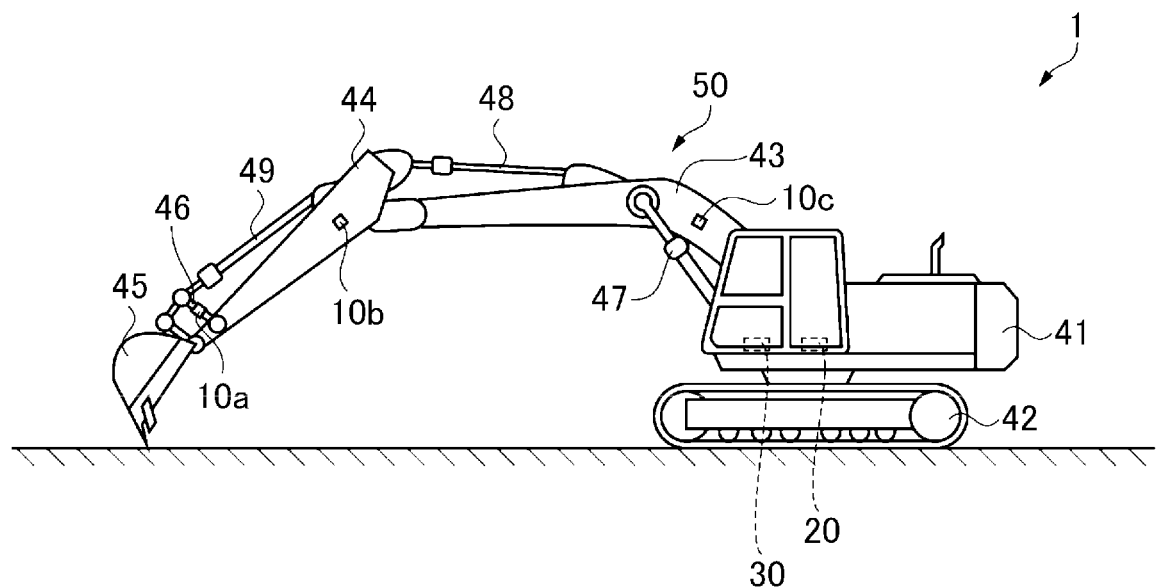
FIG. 1 shows an example of a movable structure according to an embodiment.

FIG. 1 shows an example of a movable structure 1 according to an embodiment. In FIG. 1, a hydraulic shovel, which is an example of a construction machine, is shown as the movable structure 1.

As shown in FIG. 1, the movable structure 1 has a movable structure body formed of a lower traveling unit 42 and an upper rotating unit 41 rotatably installed above the lower traveling unit 42. At the front of the upper rotating unit 41, a work mechanism 50 formed of a plurality of members that can pivot in up-down directions is provided. The upper rotating unit 41 is provided with a driver's seat, not illustrated. The driver's seat is provided with an operation device, not illustrated, for operating each member forming the work mechanism 50. The upper rotating unit 41 is also provided with a sensor module 30 detecting a tilt angle of the upper rotating unit 41.

The work mechanism 50 has, as the plurality of members, a boom 43, an arm 44, and a bucket 45, which are moving parts pivoting about predetermined axes. The work mechanism 50 also has a bucket link 46, a boom cylinder 47, an arm cylinder 48, and a bucket cylinder 49.

The boom 43 is attached to the front of the upper rotating unit 41 in such a way as to be able to look up and down. The arm 44 is attached to a distal end of the boom 43 in such a way as to be able to look up and down. The bucket link 46 is attached to a distal end of the arm 44 in such a way as to be able to pivot. The bucket 45 is attached to a distal end of the bucket link 46 in such a way as to be able to pivot. The boom cylinder 47 drives the boom 43. The arm cylinder 48 drives the arm 44. The bucket cylinder 49 drives the bucket 45 via the bucket link 46.

A proximal end of the boom 43 is supported at the upper rotating unit 41 in such a way as to be able to pivot in up-down directions. The boom 43 is rotationally driven relatively to the upper rotating unit 41 by the expansion and contraction of the boom cylinder 47. The boom 43 is provided with a sensor module 10c detecting the state of movement of the boom 43.

At the distal end of the boom 43, one end of the arm 44 is rotatably supported. The arm 44 is rotationally driven relatively to the boom 43 by the expansion and contraction of the arm cylinder 48. The arm 44 is provided with a sensor module 10b detecting the state of movement of the arm 44.

At the distal end of the arm 44, the bucket link 46 and the bucket 45 are supported in such a way as to be able to pivot. The bucket link 46 is rotationally driven relatively to the arm 44 by the expansion and contraction of the bucket cylinder 49. The bucket 45, interlocked with the bucket link 46, is rotationally driven relatively to the arm 44. The bucket link 46 is provided with a sensor module 10a detecting the state of movement of the bucket link 46.

The sensor modules 10a, 10b, 10c are removable and attached respectively to the bucket link 46, which is a site interlocked with the bucket 45 as a moving part, to the arm 44, which is a moving part, and to the boom 43, which is a moving part. The sensor modules 10a, 10b, 10c can detect an angular velocity and an acceleration acting on the bucket link 46, the arm 44, and the boom 43, respectively. The sensor module 30 can detect an angular velocity and an acceleration acting on the upper rotating unit 41. In this embodiment, the sensor module 10a is provided at the bucket link 46 instead of the bucket 45, in order to reduce a physical stress due to an impact applied on the bucket 45.

The movable structure 1 is also provided with a control device 20 computing a tilt angle of the upper rotating unit 41 and positions and attitudes of the boom 43, the arm 44, and the bucket 45 forming the work mechanism 50.

The control device 20 controls the boom 43, the arm 44, and the bucket 45, which are moving parts, and the sensor modules 10a, 10b, 10c. Specifically, the control device 20 computes the positions and attitudes of the boom 43, the arm 44, and the bucket 45, based on output signals from the sensor modules 10a, 10b, 10c, and computes the tilt angle of the upper rotating unit 41, based on an output signal from the sensor module 30. The control device 20 controls the operations of the boom 43, the arm 44, the bucket 45, and the upper rotating unit 41, based on the computed positions and attitudes of the boom 43, the arm 44, and the bucket 45, and the computed tilt angle of the upper rotating unit 41. The computed positions and attitudes of the boom 43, the arm 44, and the bucket 45, and the computed tilt angle of the upper rotating unit 41 are also used for a display on a monitor device, not illustrated, at the driver's seat.

The control device 20 gives a calibration instruction to the sensor modules 10a, 10b, 10c and controls the timing of calibration processing on the sensor modules 10a, 10b, 10c, described later.

Figure 2:
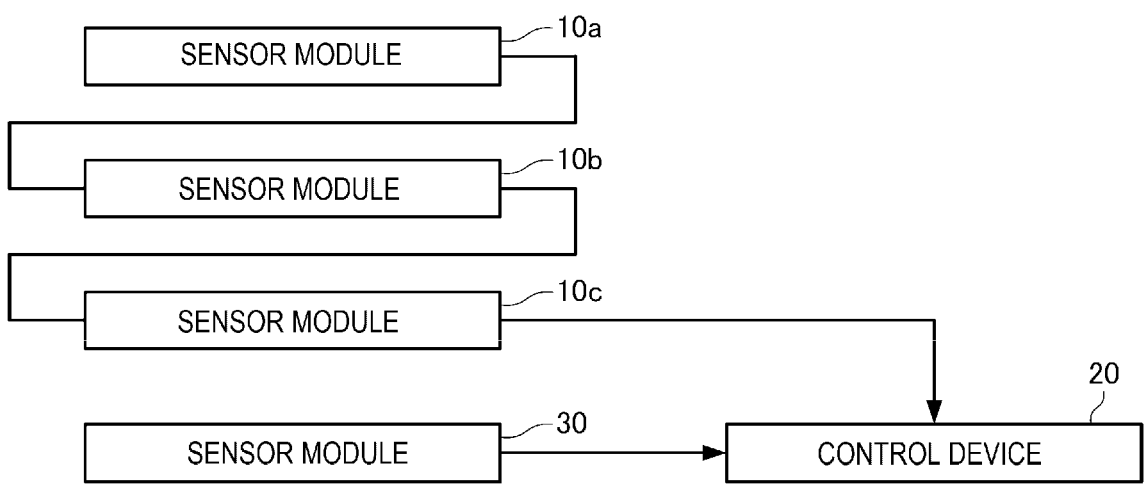
FIG. 2 shows an example of coupling a sensor module and a control device together.

FIG. 2 shows an example of coupling the sensor modules 10a, 10b, 10c, 30 and the control device 20 together. As shown in FIG. 2, the sensor modules 10a, 10b, 10c are coupled in series and can transmit a detection signal to the control device 20. Coupling the sensor modules 10a, 10b, 10c in series in this way can reduce the number of wirings for transmitting a detection signal within a moving area and can provide a compact wiring structure. The compact wiring structure can make it easier to select a method for arranging the wirings and can reduce the occurrence of deterioration, damage and the like of the wirings.

1-2. Configuration of Sensor Module

In this embodiment, an X-axis, a Y-axis, and a Z-axis, which are three axes orthogonal to each other, are defined for each of the sensor modules 10a, 10b, 10c, 30. The sensor modules 10a, 10b, 10c, 30 detect an angular velocity about each of the X-axis, the Y-axis, and the Z-axis, and an acceleration along each of the X-axis, the Y-axis, and the Z-axis. The X-axes, Y-axes, and Z-axes of the sensor modules 10a, 10b, 10c, 30 need not coincide with each other. The sensor modules 10a, 10b, 10c have the same configuration. Therefore, in the description below, each of the sensor modules 10a, 10b, 10c may be referred to as the sensor module 10. In this embodiment, the sensor module 30 has the same configuration as the sensor module 10 described below.

Figure 3:
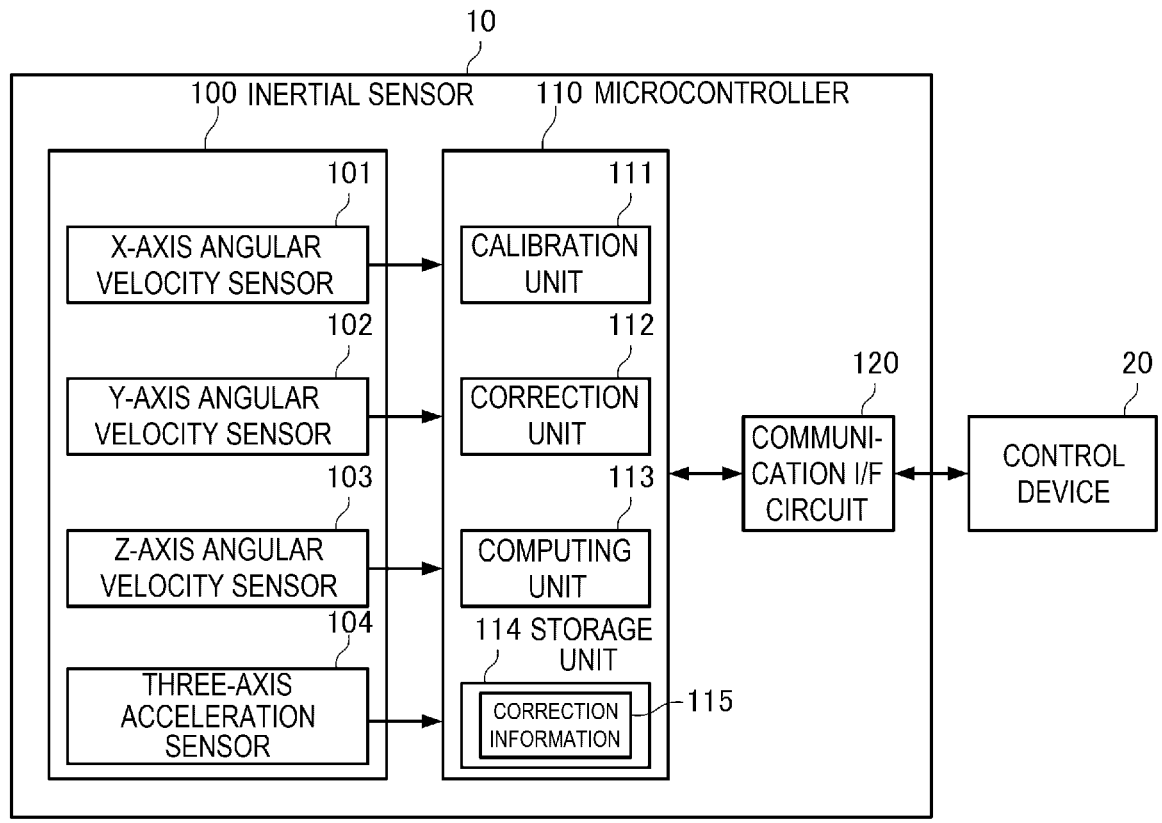
FIG. 3 shows an example of the configuration of the sensor module.

FIG. 3 shows an example of the configuration of the sensor module 10. As shown in FIG. 3, the sensor module 10 includes an inertial sensor 100, a microcontroller 110, and a communication interface circuit 120. The inertial sensor 100, the microcontroller 110, and the communication interface circuit 120 are accommodated in a package, not illustrated. For example, the microcontroller 110 and the communication interface circuit 120 may be included in a one-chip integrated circuit device, and the inertial sensor 100 and this integrated circuit device may be accommodated in the package.

The inertial sensor 100 includes an X-axis angular velocity sensor 101, a Y-axis angular velocity sensor 102, a Z-axis angular velocity sensor 103, and a three-axis acceleration sensor 104.

The X-axis angular velocity sensor 101 includes an angular velocity detection element, not illustrated, which detects an angular velocity, and a detection circuit, not illustrated, which performs amplification, synchronous detection, gain adjustment or the like on a signal from the angular velocity detection element and generates a detection signal corresponding to the direction and magnitude of the angular velocity about the X-axis. The detection circuit includes an A/D converter circuit converting the detection signal into a digital signal. The X-axis angular velocity sensor 101 is arranged in such a way that the detection axis of the angular velocity detection element is laid along the X-axis. The X-axis angular velocity sensor 101 transmits the digital signal outputted from the A/D converter circuit, as X-axis angular velocity data to the microcontroller 110.

The Y-axis angular velocity sensor 102 has the same configuration as the X-axis angular velocity sensor 101 but is arranged in such a way that the detection axis of the angular velocity detection element is laid along the Y-axis. The Y-axis angular velocity sensor 102 transmits the digital signal outputted from the A/D converter circuit, as Y-axis angular velocity data to the microcontroller 110.

The Z-axis angular velocity sensor 103 has the same configuration as the X-axis angular velocity sensor 101 and the Y-axis angular velocity sensor 102 but is arranged in such a way that the detection axis of the angular velocity detection element is laid along the Z-axis. The Z-axis angular velocity sensor 103 transmits the digital signal outputted from the A/D converter circuit, as Z-axis angular velocity data to the microcontroller 110.

The three-axis acceleration sensor 104 includes three acceleration detection elements, and a detection circuit, not illustrated, which performs amplification, synchronous detection, gain adjustment or the like on a signal from each acceleration detection element and generates a detection signal corresponding to the direction and magnitude of the acceleration about each axis. The detection circuit includes an A/D converter circuit converting the respective detection signals about the three axes into digital signals about the three axes. The three-axis acceleration sensor 104 is arranged in such a way that the detection axes of the three acceleration detection elements are laid along the X-axis, the Y-axis, and the Z-axis. The three-axis acceleration sensor 104 transmits the digital signals about the three axes outputted from the A/D converter circuit, as X-axis acceleration data, Y-axis acceleration data, and Z-axis acceleration data to the microcontroller 110.

Also, the X-axis angular velocity sensor 101, the Y-axis angular velocity sensor 102, the Z-axis angular velocity sensor 103, and the three-axis acceleration sensor 104 may output a detection signal that is an analog signal, and the microcontroller 110 may convert each detection signal into a digital signal.

The microcontroller 110 includes a calibration unit 111, a correction unit 112, a computing unit 113, and a storage unit 114.

The calibration unit 111 performs calibration processing to make the direction of each axis of the sensor module 10 and the direction of each corresponding axis of the sensor module 30 coincide with each other. The calibration unit 111 may perform the calibration processing, for example, when the control device 20 writes predetermined data via the communication interface circuit 120 into a predetermined register, not illustrated, included in the storage unit 114. In this embodiment, a correspondence between the three axes of the sensor module 10 and the three axes of the sensor module 30 can be arbitrarily set. For example, the Y-axis, Z-axis, and X-axis of the sensor module 10 may be made to correspond to the X-axis, Y-axis, and Z-axis of the sensor module 30.

Specifically, the calibration unit 111 calculates the attitude of the sensor module 10 based on an output signal from the inertial sensor 100 in response to the calibration instruction received from the control device 20 via the communication interface circuit 120, and generates correction information 115 based on the difference between the calculated attitude and a first attitude. For example, the calibration unit 111 specifies the direction of gravity based on X-axis acceleration data, Y-axis acceleration data, and Z-axis acceleration data outputted from the inertial sensor 100, and can calculate the attitude of the sensor module 10, based on the relationship between the X-axis, the Y-axis, and the Z-axis, and the direction of gravity.

The correction information 115 may be a rotation matrix for rotating the X-axis, the Y-axis, and the Z-axis while maintaining orthogonality between these axes, for example, in such a way as to make the calculated attitude of the sensor module 10 coincide with the first attitude. The correction information 115 generated by the calibration unit 111 is stored into the storage unit 114. The first attitude is a basic attitude of the sensor module 10 in a coordinate system defined by the three axes of the sensor module 30.

Figure 4:
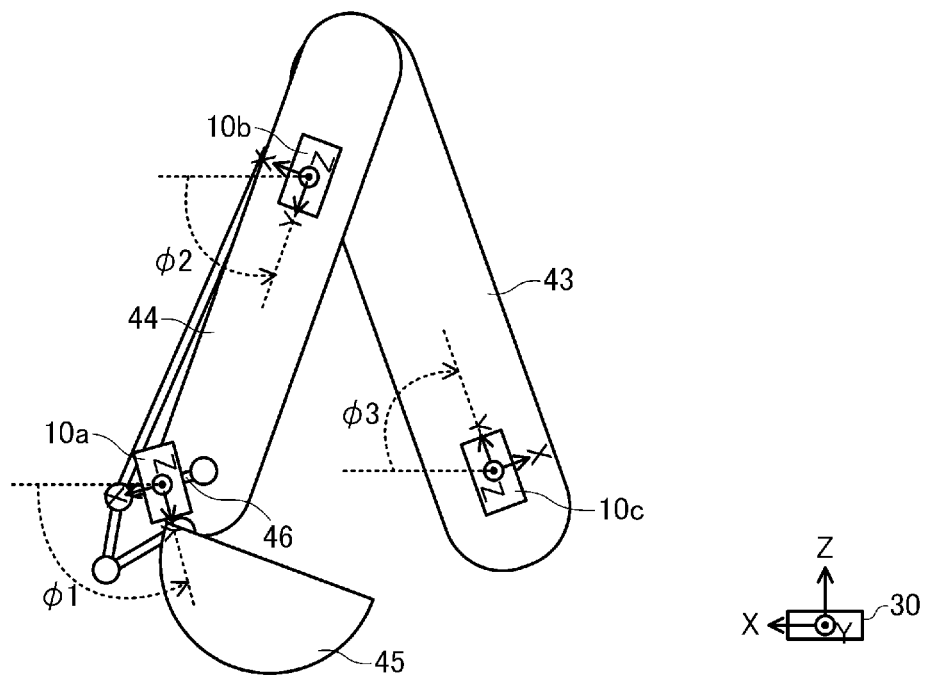
FIG. 4 shows an example of a first attitude of the sensor module in a first embodiment.

FIG. 4 shows an example of the first attitude of each of the sensor modules 10a, 10b, 10c. In FIG. 4, a part of the movable structure 1 is illustrated in a simplified manner. In the example in FIG. 4, the sensor module 10a is provided at the bucket link 46. The sensor module 10b is provided at the lateral side of the arm 44. The sensor module 10c is provided at the lateral side of the boom 43. The Z-axes of the sensor modules 10a, 10b, 10c are laid in the same direction. The sensor module 30 is provided, for example, at the floor surface of the driver's seat in the upper rotating unit 41.

In this embodiment, the attitude of the sensor module 30 is defined by the roll angle about the X-axis, the pitch angle about the Y-axis, and the yaw angle about the Z-axis. In the example in FIG. 4, the Y-axis, Z-axis, and X-axis of the sensor modules 10a, 10b, 10c are set to correspond to the X-axis, Y-axis, and Z-axis of the sensor module 30, respectively. The attitude of the sensor modules 10a, 10b, 10c is defined by the roll angle about the Y-axis, the pitch angle about the Z-axis, and the yaw angle about the X-axis. In the calibration processing, all of the roll angle, pitch angle, and yaw angle of the sensor module 30 are assumed to be 0°. When the Y-axis, Z-axis, and X-axis of the sensor modules 10a, 10b, 10c coincide with the X-axis, Y-axis, and Z-axis of the sensor module 30, respectively, all of the roll angle, pitch angle, and yaw angle of the sensor modules 10a, 10b, 10c are 0°.

In the example in FIG. 4, during the execution of the calibration processing, the boom 43, the arm 44, and the bucket 45 are static in a bent state. The first attitude of the sensor module 10a has a roll angle of 0°, a pitch angle of $\phi 1$, and a yaw angle of 0°. The first attitude of the sensor module 10b has a roll angle of 0°, a pitch angle of $\phi 2$, and a yaw angle of 0°. The first attitude of the sensor module 10c has a roll angle of 0°, a pitch angle of $\phi 3$, and a yaw angle of 0°. For example, $\phi 1 < \phi 2 < 0 < \phi 3$ holds. Therefore, the calibration unit 111 of the sensor module 10a generates the correction information 115 to correct the roll angle, pitch angle, and yaw angle calculated based on the output signal from the inertial sensor 100, to 0°, $\phi 1$, 0°, respectively. The calibration unit 111 of the sensor module 10b generates the correction information 115 to correct the roll angle, pitch angle, and yaw angle calculated based on the output signal from the inertial sensor 100, to 0°, $\phi 2$, 0°, respectively. The calibration unit 111 of the sensor module 10c generates the correction information 115 to correct the roll angle, pitch angle, and yaw angle calculated based on the output signal from the inertial sensor 100, to 0°, $\phi 3$, 0°, respectively.

Back to FIG. 3, the correction unit 112 corrects the output signal from the inertial sensor 100, based on the correction information 115. For example, when the correction information 115 is a rotation matrix, the correction unit 112 calculates a matrix product of the X-axis angular velocity data, the Y-axis angular velocity data, the Z-axis angular velocity data, the X-axis acceleration data, the Y-axis acceleration data, and the Z-axis acceleration data outputted from the inertial sensor 100, and the rotation matrix, and thus corrects each data.

The computing unit 113 performs predetermined computation based on the X-axis angular velocity data, the Y-axis angular velocity data, the Z-axis angular velocity data, the X-axis acceleration data, the Y-axis acceleration data, and the Z-axis acceleration data corrected by the correction unit 112. For example, the computing unit 113 may calculate the position of the sensor module 10, based on the X-axis acceleration data, the Y-axis acceleration data, and the Z-axis acceleration data. The computing unit 113 may also compute, for example, the attitude of the sensor module 10, that is, the roll angle, the pitch angle, and the yaw angle, based on the X-axis angular velocity data, the Y-axis angular velocity data, and the Z-axis angular velocity data. When the sensor module 10 includes, for example, a temperature sensor, the computing unit 113 may correct temperature characteristics of the X-axis angular velocity data, the Y-axis angular velocity data, the Z-axis angular velocity data, the X-axis acceleration data, the Y-axis acceleration data, and the Z-axis acceleration data, based on an output signal from the temperature sensor.

The storage unit 114 is implemented by a semiconductor memory, register or the like and stores various kinds of information necessary for the processing by the microcontroller 110. In this embodiment, the storage unit 114 stores the correction information 115. The storage unit 114 may also store information about the first attitude received from the control device 20 via the communication interface circuit 120.

The communication interface circuit 120 is a circuit for communicating data with the control device 20. The communication interface circuit 120 may perform interface processing, for example, according to the SPI (Serial Peripheral Interface) communication standard or the I2C (Inter-Integrated Circuit) communication standard. In this embodiment, the communication interface circuit 120 receives the X-axis angular velocity data, the Y-axis angular velocity data, the Z-axis angular velocity data, the X-axis acceleration data, the Y-axis acceleration data, and the Z-axis acceleration data corrected by the correction unit 112, and transmits these data to the control device 20. The communication interface circuit 120 may also transmit data resulting from the computation by the computing unit 113 to the control device 20. The communication interface circuit 120 also receives the calibration instruction and the information about the first attitude from the control device 20 and outputs these pieces of information to the microcontroller 110.

1-3. Configuration of Control Device

Figure 5:
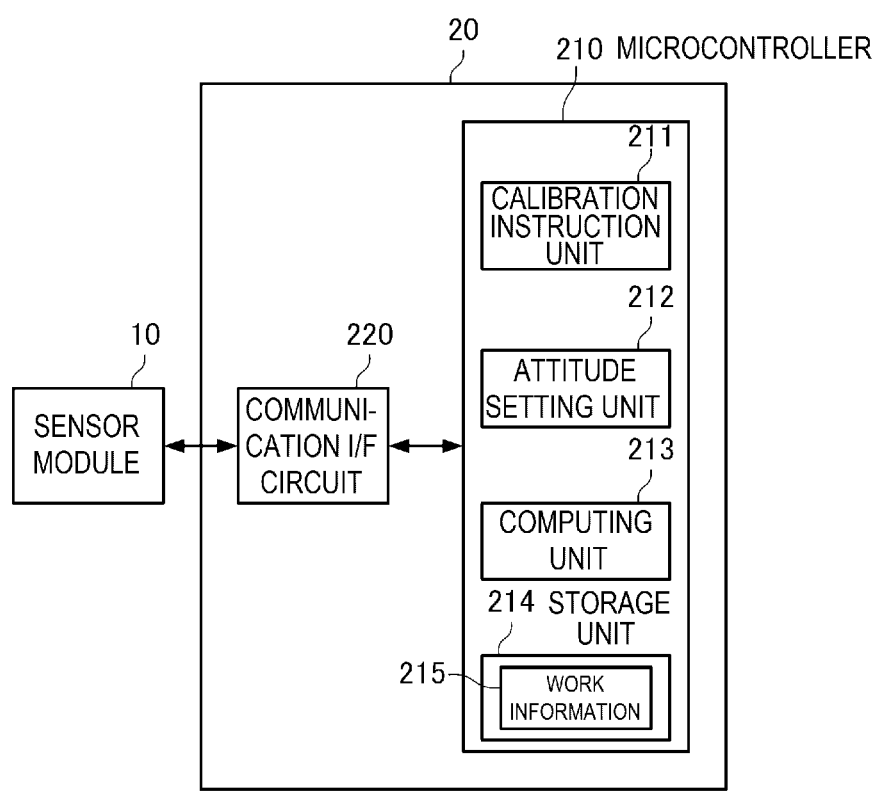
FIG. 5 shows an example of the configuration of the control device in the first embodiment.

FIG. 5 shows an example of the configuration of the control device 20. As shown in FIG. 20, the control device 20 includes a microcontroller 210 and a communication interface circuit 220.

The microcontroller 210 includes a calibration instruction unit 211, an attitude setting unit 212, a computing unit 213, and a storage unit 214.

The calibration instruction unit 211 gives a calibration instruction to the sensor module 10 via the communication interface circuit 220. The calibration instruction unit 211 may give a calibration instruction to the sensor module 10, for example, when an external device, not illustrated, writes predetermined data into a predetermined register, not illustrated, included in the storage unit 214.

The attitude setting unit 212 transmits information about the first attitude to the sensor module 10 via the communication interface circuit 220. The attitude setting unit 212 may transmit the information of the first attitude to the sensor module 10, for example, when an external device, not illustrated, writes the information about the first attitude into a predetermined register, not illustrated, included in the storage unit 214. The information about the first attitude may also be used as the calibration instruction. That is, the attitude setting unit 212 may also function as the calibration instruction unit 211.

The computing unit 213 receives various data from the sensor module 10 via the communication interface circuit 220 and performs predetermined computation based on the various data and work information 215 stored in the storage unit 214. Particularly, in this embodiment, the computing unit 213 controls the boom 43, the arm 44, and the bucket 45, which are moving parts, based on the X-axis angular velocity data, the Y-axis angular velocity data, the Z-axis angular velocity data, the X-axis acceleration data, the Y-axis acceleration data, and the Z-axis acceleration data, which are output signals from the inertial sensor 100 corrected by the correction unit 112 in the sensor module 10. For example, the computing unit 213 may calculate the positions and attitudes of the boom 43, the arm 44, and the bucket 45, based on the X-axis angular velocity data, the Y-axis angular velocity data, the Z-axis angular velocity data, the X-axis acceleration data, the Y-axis acceleration data, and the Z-axis acceleration data, and controls the positions and attitudes of the boom 43, the arm 44, and the bucket 45 in such a way that work designed by the work information 215 is carried out, based on the result of the computation. Thus, the position of the teeth of the bucket 45 is controlled and the work designated by the work information 215 is carried out semi-automatically. When the sensor module 10 computes its own position and attitude and transmits the computed position and attitude to the control device 20, the computing unit 213 may control the positions and attitudes of the boom 43, the arm 44, and the bucket 45, using this position and attitude.

The computing unit 213 also computes the tilt angle of the upper rotating unit 41, based on the X-axis angular velocity data, the Y-axis angular velocity data, the Z-axis angular velocity data, the X-axis acceleration data, the Y-axis acceleration data, and the Z-axis acceleration data outputted from the sensor module 30, and controls the operation of the upper rotating unit 41, based on the result of the computation. The computing unit 213 may control, for example, the positions and attitudes of the boom 43, the arm 44, the bucket 45, and the upper rotating unit 41 in such a way that the work designated by the work information 215 is carried out, based on the tilt angle of the upper rotating unit 41 as well as the positions and attitudes of the boom 43, the arm 44, and the bucket 45.

The computing unit 213 controls the boom 43, the arm 44, and the bucket 45, which are moving parts, in such a way that the sensor module 10 takes the first attitude, before the calibration instruction unit 211 gives the calibration instruction to the sensor module 10. For example, an operator may operate an operation device in such a way that the sensor module 10 takes the first attitude, and in response to this operation, the computing unit 213 may control the boom 43, the arm 44, and the bucket 45 to become static in a predetermined state. Also, the computing unit 213 may control the boom 43, the arm 44, and the bucket 45 to become static in a predetermined state in such a way that the sensor module 10 automatically takes the first attitude, without involving an operator.

The storage unit 214 is implemented by a semiconductor memory, register or the like and stores various kinds of information necessary for the processing by the microcontroller 210. In this embodiment, the storage unit 214 stores the work information 215 prescribing work to be carried out by the movable structure 1. The storage unit 214 may also store various data received from the sensor module 10 via the communication interface circuit 220.

The communication interface circuit 220 is a circuit for communicating data with the sensor module 10. The communication interface circuit 220 may perform interface processing, for example, according to the SPI communication standard or the I2C communication standard. In this embodiment, the communication interface circuit 220 receives the X-axis angular velocity data, the Y-axis angular velocity data, the Z-axis angular velocity data, the X-axis acceleration data, the Y-axis acceleration data, and the Z-axis acceleration data from the sensor module 10 and outputs these data to the microcontroller 210. The communication interface circuit 220 also receives the calibration instruction and the information about the first attitude from the microcontroller 210 and transmits these to the sensor module 10.

1-4. Method for Calibrating Sensor Module

Figure 6:
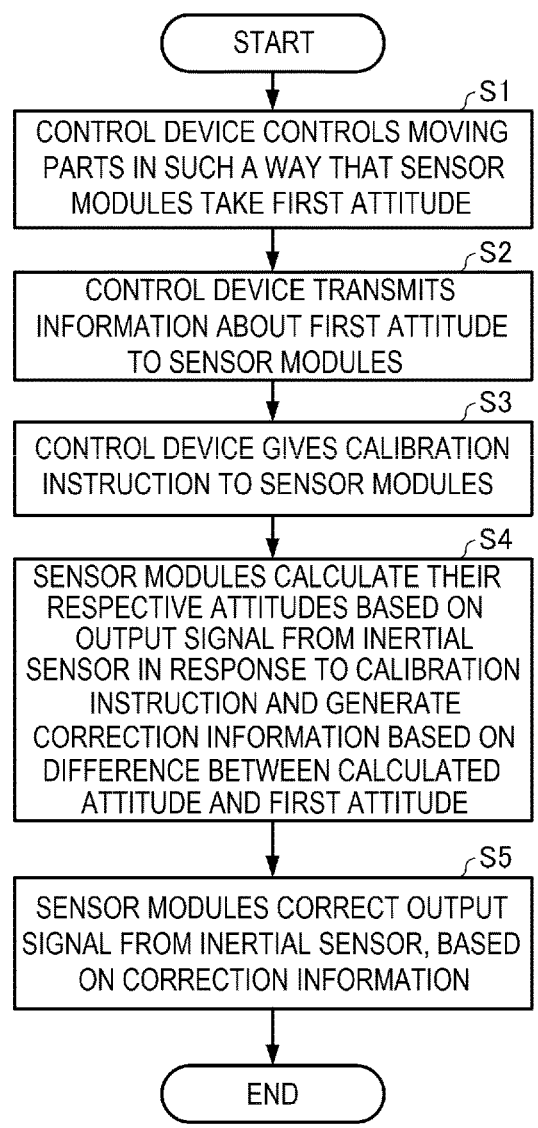
FIG. 6 is a flowchart showing an example of procedures in a method for calibrating the sensor module in the first embodiment.

FIG. 6 is a flowchart showing an example of procedures in a method for calibrating the sensor module 10.

As shown in FIG. 6, first, in step S1, the control device 20 controls the boom 43, the arm 44, and the bucket 45, which are moving parts, in such a way that each of the sensor modules 10a, 10b, 10c takes the first attitude.

Next, in step S2, the control device 20 transmits information about the first attitude to each of the sensor modules 10a, 10b, 10c.

Next, in step S3, the control device 20 gives a calibration instruction to each of the sensor modules 10a, 10b, 10c.

Next, in step S4, the sensor modules 10a, 10b, 10c calculate their respective attitudes based on an output signal from the inertial sensor 100 in response to the calibration instruction and generate the correction information 115 based on the difference between the calculated attitude and the first attitude.

Finally, in step S5, each of the sensor modules 10a, 10b, 10c corrects the output signal from the inertial sensor 100, based on the correction information 115.

1-5. Advantageous Effects

As described above, in the first embodiment, the control device 20 controls the boom 43, the arm 44, and the bucket 45, which are moving parts, in such a way that the sensor modules 10a, 10b, 10c take the first attitude, and the control device 20 also gives a calibration instruction to the sensor modules 10a, 10b, 10c. The sensor modules 10a, 10b, 10c calculate their respective attitudes based on an output signal from the inertial sensor 100 in response to the calibration instruction, generate the correction information 115 based on the difference between the calculated attitude and the first attitude, and correct the output signal from the inertial sensor 100. Therefore, according to the first embodiment, since the sensor modules 10a, 10b, 10c perform calibration on their own based on the information about the first attitude transmitted from the control device 20, there is no need to use a measuring machine such as a laser radiator and the calibration of the sensor modules 10a, 10b, 10c can be performed easily.

According to the first embodiment, the control device 20 transmits the information about the first attitude to the sensor modules 10a, 10b, 10c. Therefore, the first attitude can be arbitrarily set according to the arrangement and structure of the moving parts and a high level of convenience can be achieved.

According to the first embodiment, the control device 20 controls the moving parts based on an output signal from the inertial sensor 100 and therefore can control the moving parts with high accuracy.

2. Second Embodiment

A movable structure 1 according to a second embodiment will now be described mainly in terms of different elements from those in the first embodiment. Components similar those in the first embodiment are denoted by the same reference signs and descriptions similar to those in the first embodiment are omitted or simplified. In the description below, as in the first embodiment, the hydraulic shovel shown in FIG. 1 is employed as the movable structure 1 according to the second embodiment.

Figure 7:
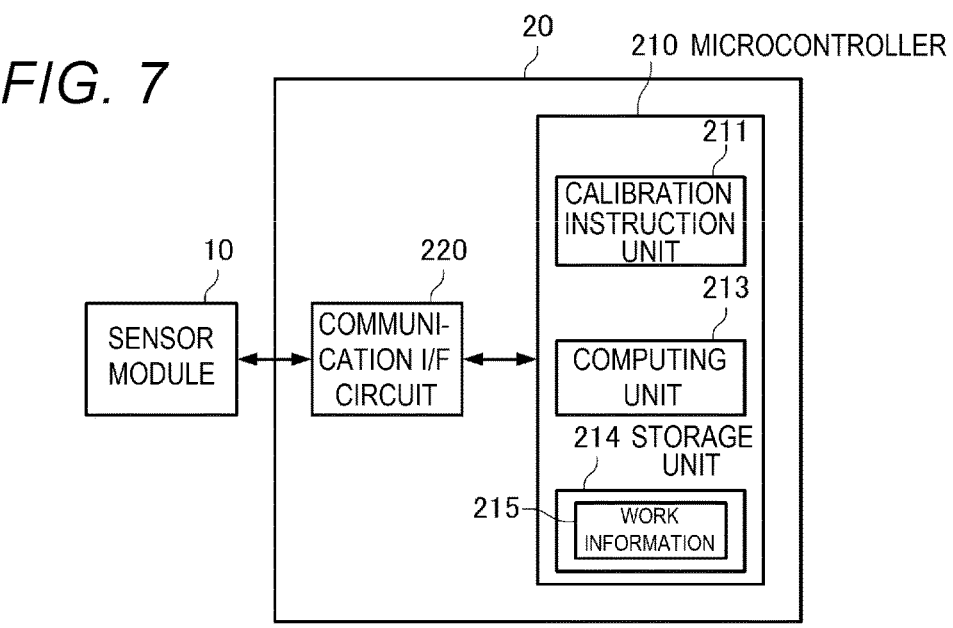
FIG. 7 shows an example of the configuration of a control device in a second embodiment.

FIG. 7 shows an example of the configuration of a control device 20 in the second embodiment. As shown in FIG. 7, the control device 20 in the second embodiment includes a microcontroller 210 and a communication interface circuit 220, as in the first embodiment.

The microcontroller 210 includes a calibration instruction unit 211, a computing unit 213, and a storage unit 214, as in the first embodiment.

The calibration instruction unit 211 gives a calibration instruction to a sensor module 10 via the communication interface circuit 220, as in the first embodiment.

The computing unit 213 controls the boom 43, the arm 44, and the bucket 45, which are moving parts, based on X-axis angular velocity data, Y-axis angular velocity data, Z-axis angular velocity data, X-axis acceleration data, Y-axis acceleration data, and Z-axis acceleration data, which are an output signal from an inertial sensor 100 corrected by a correction unit 112 in the sensor module 10, as in the first embodiment. Also, as in the first embodiment, the computing unit 213 controls the boom 43, the arm 44, and the bucket 45, which are moving parts, in such a way that the sensor module 10 takes the first attitude, before the calibration instruction unit 211 gives the calibration instruction to the sensor module 10.

The storage unit 214 stores various kinds of information necessary for the processing by the microcontroller 210, for example, work information 215 prescribing work and various data received from the sensor module 10 via the communication interface circuit 220, as in the first embodiment.

The communication interface circuit 220 receives the X-axis angular velocity data, the Y-axis angular velocity data, the Z-axis angular velocity data, the X-axis acceleration data, the Y-axis acceleration data, and the Z-axis acceleration data from the sensor module 10 and outputs these data to the microcontroller 210, as in the first embodiment.

In the second embodiment, unlike in the first embodiment, the microcontroller 210 does not include the attitude setting unit 212. Therefore, the communication interface circuit 220 receives a calibration instruction from the microcontroller 210 and transmits the calibration instruction to the sensor module 10 but does not transmit information about the first attitude to the sensor module 10.

Although the example of the configuration of the sensor module 10 in the second embodiment is similar to FIG. 3 and therefore is not illustrated here, the sensor module 10 includes, an inertial sensor 100, a microcontroller 110, and a communication interface circuit 120, as in the first embodiment. The configuration and functions of the inertial sensor 100 are similar to those in the first embodiment and therefore not described further here.

The microcontroller 110 includes a calibration unit 111, a correction unit 112, a computing unit 113, and a storage unit 114, as in the first embodiment. The functions of the correction unit 112, the computing unit 113, and the storage unit 114 are similar to those in the first embodiment and therefore not described further here.

The calibration unit 111 performs calibration processing to make the direction of each axis of the sensor module 10 and the direction of each corresponding axis of the sensor module 30 coincide with each other, as in the first embodiment. Specifically, the calibration unit 111 calculates the attitude of the sensor module 10 based on an output signal from the inertial sensor 100 in response to the calibration instruction received from the control device 20 via the communication interface circuit 120, and generates correction information 115 based on the difference between the calculated attitude and the first attitude.

As in the first embodiment, the first attitude is a basic attitude of the sensor module 10 in a coordinate system defined by the three axes of the sensor module 30. However, in the second embodiment, the first attitude is a predetermined attitude. The calibration unit 111 recognizes the first attitude. Therefore, in the second embodiment, the control device 20 does not transmit the information about the first attitude to the sensor module 10, whereas in the first embodiment, the control device 20 transmits the information about the first attitude to the sensor module 10.

Figure 8:
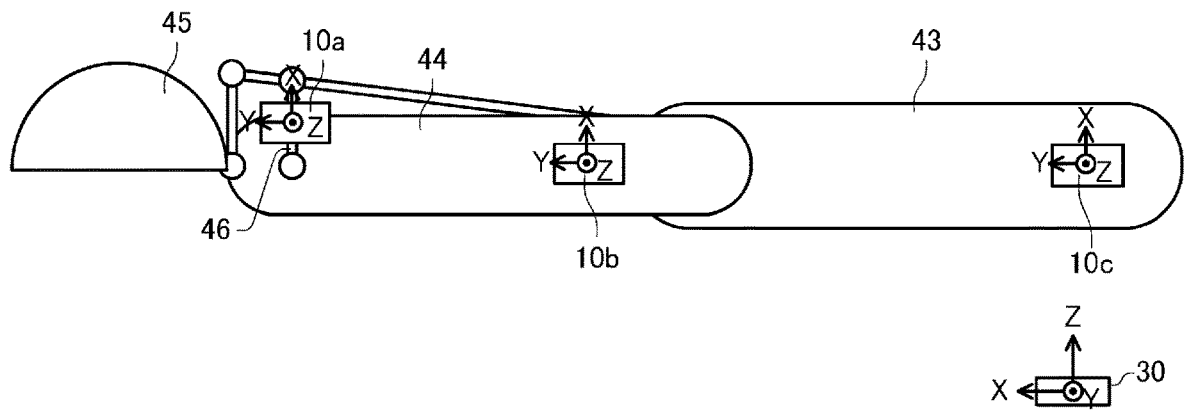
FIG. 8 shows an example of the first attitude of a sensor module in the second embodiment.

FIG. 8 shows an example of the first attitude of each of the sensor modules 10*a*, 10*b*, 10*c* in the second embodiment. In FIG. 8, a part of the movable structure 1 is illustrated in a simplified manner. In the example in FIG. 8, the sensor module 10*a* is provided at the bucket link 46. The sensor module 10*b* is provided at the lateral side of the arm 44. The sensor module 10*c* is provided at the lateral side of the boom 43. The X-axes, Y-axes, and Z-axes of the sensor modules 10*a*, 10*b*, 10*c* are laid in the same direction, respectively. The sensor module 30 is provided, for example, at the floor surface of the driver's seat in the upper rotating unit 41.

In the second embodiment, too, the attitude of the sensor module 30 is defined by the roll angle about the X-axis, the pitch angle about the Y-axis, and the yaw angle about the Z-axis. In the example in FIG. 8, the Y-axis, Z-axis, and X-axis of the sensor modules 10*a*, 10*b*, 10*c* are set to correspond to the X-axis, Y-axis, and Z-axis of the sensor module 30, respectively. The attitude of the sensor modules 10*a*, 10*b*, 10*c* is defined by the roll angle about the Y-axis, the pitch angle about the Z-axis, and the yaw angle about the X-axis. In the example in FIG. 8, during the execution of the calibration processing, the boom 43, the arm 44, and the bucket 45 are static in the state of being extended linearly, and the first attitude of each of the sensor modules 10*a*, 10*b*, 10*c* has a role angle of 0°, a pitch angle of 0°, and a yaw angle of 0°. Therefore, the calibration unit 111 of each of the sensor modules 10*a*, 10*b*, 10*c* generates the correction information 115 to correct the roll angle, pitch angle, and yaw angle calculated based on the output signal from the inertial sensor 100, to 0°.

Figure 9:
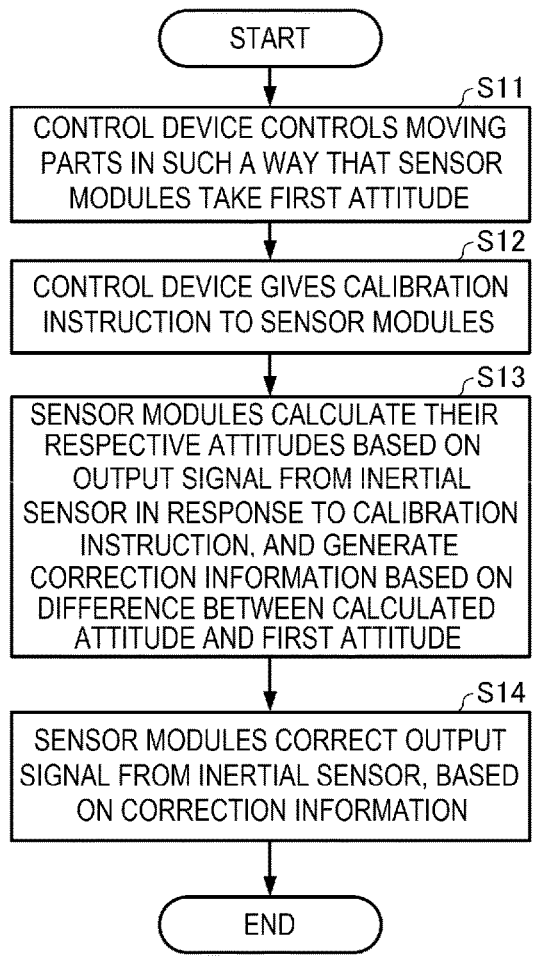
FIG. 9 is a flowchart showing an example of procedures in a method for calibrating the sensor module in the second embodiment.

FIG. 9 is a flowchart showing an example of procedures in a method for calibrating the sensor module 10 in the second embodiment.

As shown in FIG. 9, first, in step S11, the control device 20 controls the boom 43, the arm 44, and the bucket 45, which are moving parts, in such a way that each of the sensor modules 10*a*, 10*b*, 10*c* takes the first attitude.

Next, in step S12, the control device 20 gives a calibration instruction to each of the sensor modules 10*a*, 10*b*, 10*c*.

Next, in step S13, the sensor modules 10*a*, 10*b*, 10*c* calculate their respective attitudes based on an output signal from the inertial sensor 100 in response to the calibration instruction and generate the correction information 115 based on the difference between the calculated attitude and the first attitude.

Finally, in step S14, each of the sensor modules 10*a*, 10*b*, 10*c* corrects the output signal from the inertial sensor 100, based on the correction information 115.

As described above, in the second embodiment, the control device 20 controls the boom 43, the arm 44, and the bucket 45, which are moving parts, in such a way that the sensor modules 10*a*, 10*b*, 10*c* take the first attitude, and the control device 20 also gives a calibration instruction to the sensor modules 10*a*, 10*b*, 10*c*. The sensor modules 10*a*, 10*b*, 10*c* calculate their respective attitudes based on an output signal from the inertial sensor 100 in response to the calibration instruction, generate the correction information 115 based on the difference between the calculated attitude and the first attitude, and correct the output signal from the inertial sensor 100. Therefore, according to the second embodiment, since the sensor modules 10*a*, 10*b*, 10*c* perform calibration on their own based on the first attitude, there is no need to use a measuring machine such as a laser radiator and the calibration of the sensor modules 10*a*, 10*b*, 10*c* can be performed easily.

According to the second embodiment, the first attitude is a predetermined attitude. Therefore, the control device 20 need not transmit the information about the first attitude to the sensor modules 10*a*, 10*b*, 10*c*. The processing load on the control device 20 is lighter and the time taken for the calibration processing is shorter than in the first embodiment.

According to the second embodiment, the control device 20 controls the moving parts, based on the corrected output signal from the inertial sensor 100, and therefore can control the moving parts with high accuracy.

3. Modification Examples

In the embodiments, the inertial sensor 100 included in the sensor module 10 detects an angular velocity on three axes and an acceleration on three axes. However, the inertial sensor 100 may detect an angular velocity on one axis, two axes, or four or more axes and may detect an acceleration on one axis, two axes, or four or more axes. The inertial sensor 100 may also have a sensor other than an angular velocity sensor or acceleration sensor, for example, a temperature sensor or the like.

In the embodiments, the sensor module 10*a* is provided at the bucket link 46, which is a site interlocked with the bucket 45. However, the sensor module 10*a* may be provided at the bucket 45. The sensor module 10*b*, which is provided at the arm 44, may be provided at the arm cylinder 48, which is a site interlocked with the arm 44. Similarly, the sensor module 10*c*, which is provided at the boom 43, may be provided at the boom cylinder 47, which is a site interlocked with the boom 43.

In the embodiments, the movable structure 1, where the moving parts provided with the sensor module 10 or the sites interlocked with the moving parts are the boom 43, the arm 44, and the bucket link 46, is described as an example. However, in the movable structure 1, the number of moving parts provided with the sensor module 10 or sites interlocked with the moving parts may be one, two, or four or more.

In the embodiments, a hydraulic shovel is employed as an example of the movable structure 1. However, the movable structure 1 may be any movable structure having a moving part rotating about a predetermined axis, for example, a construction machine such as a rough terrain crane, bulldozer or wheel loader, an agricultural machine, or a robot.

The present disclosure is not limited to the embodiments and can be carried out with various modifications within the spirit and scope of the present disclosure.

The foregoing embodiments and modification examples are simply examples and not limiting. For example, the embodiments and modification examples can be combined together according to need.

The present disclosure includes a configuration substantially the same as any of the configurations described in the embodiments (for example, a configuration having the same function, method, and effect, or a configuration having the same object and effect). The present disclosure also includes a configuration resulting from replacing a non-essential part of any of the configurations described in the embodiments. The present disclosure also includes a configuration achieving the same advantageous effect or the same object as any of the configurations described in the embodiments. The present disclosure also includes a configuration resulting from adding a known technique to any of the configurations described in the embodiments.

What is claimed is:

1. A movable structure comprising:
   a movable part that rotates around a predetermined axis;
   a first sensor module provided at the movable part or at a site interlocked with movable part, the first sensor module detecting first values with respect to three axes perpendicular to each other; and
   a control device configured to control the movable part and the first sensor module,
   wherein the control device controls the movable part in such a way that the first sensor module takes a first attitude, gives a calibration instruction to the first sensor module, and send a first roll angle, a first pitch angle, and a first yaw angle as information of the first attitude to the first sensor module, and
   the first sensor module includes:
      an inertial sensor;
      a calibration unit configured to calculate a second roll angle, a second pitch angle, and a second yaw angle as an attitude of the first sensor module based on the first values in response to the calibration instruction and generate correction information for making the second roll angle, the second pitch angle, and the second yaw angle to become the first roll angle, the first pitch angle, and the first yaw angle, respectively,
      a storage unit configured to store the correction information; and
      a correction unit configured to correct the first values based on the correction information.

2. The movable structure according to claim 1, wherein the first attitude is a predetermined attitude.

3. The movable structure according to claim 1, wherein the control device controls the movable part based on an output signal from the inertial sensor corrected by the correction unit.

4. The movable structure according to claim 1, wherein the movable part is one of a boom, an arm, and a bucket.

5. The movable structure according to claim 1, further comprising:
   a base to which an end of the movable part is attached; and
   a second sensor module provided at the base and detecting second values with respect to the three axes.

6. The movable structure according to claim 5, wherein the first attitude is a basic attitude of the first sensor module in a coordinate system defined by the three axes of the second sensor module.

7. A sensor module attached to a movable part of a movable structure or a site interlocked with the movable part, the movable structure having the movable part and a control device controlling the movable part, the movable part pivoting about a predetermined axis, the sensor module comprising:
   an inertial sensor detecting first values with respect to three axes perpendicular to each other;
   a calibration unit receiving a first roll angle, a first pitch angle, and a first yaw angle as information of a first attitude of the sensor module from the control device, calculating a second roll angle, a second pitch angle, and a second yaw angle as an attitude of the sensor module based on the first values in response to a calibration instruction from the control device, and generating correction information for making the second roll for making the second roll angle, the second pitch angle, and the second yaw angle to become the first roll angle, the first pitch angle, and the first yaw angle, respectively,
   a storage unit configured to store the correction information; and
   a correction unit configured to correct the first values based on the correction information.

8. A method for calibrating a sensor module, the sensor module including an inertial sensor and provided at a movable part or a site interlocked with movable part, the method comprising:
   detecting, by the sensor module, first values with respect to three axes perpendicular to each other;
   causing a control device to control the movable part in such a way that the sensor module takes a first attitude;
   causing the control device to give a calibration instruction to the sensor module;
   causing the control device to send a first roll angle, a first pitch angle, and a first yaw angle as information of the first attitude to the sensor module;
   causing the sensor module to calculate a second roll angle, a second pitch angle, and a second yaw angle as an attitude of the sensor module based on the first values in response to the calibration instruction and to generate correction information for making the second roll angle, the second pitch angle, and the second yaw angle to become the first roll angle, the first pitch angle, and the first yaw angle, respectively; and
   causing the sensor module to correct the first values based on the correction information.

* * * * *